Figure 1:
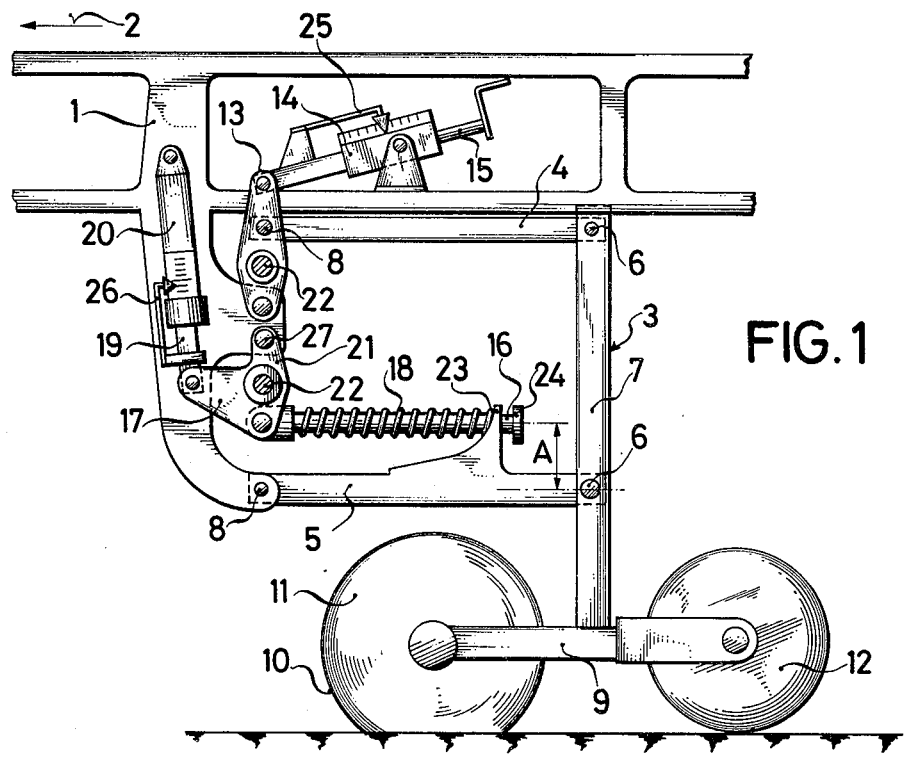

United States Patent [19]

Dreyer

[11] 4,275,670
[45] Jun. 30, 1981

[54] SEED DRILL MOUNTING ARRANGEMENT

[75] Inventor: Heinz Dreyer, Hasbergen-Gaste, Fed. Rep. of Germany

[73] Assignee: Amazonen-Werke, Hasbergen-Gaste, Fed. Rep. of Germany

[21] Appl. No.: 56,365

[22] Filed: Jul. 10, 1979

[30] Foreign Application Priority Data

Jul. 10, 1978 [DE] Fed. Rep. of Germany ....... 2830195

[51] Int. Cl.³ .............................................. A01C 5/06
[52] U.S. Cl. ........................................ 111/85; 111/87; 111/88; 111/61; 172/462; 172/484
[58] Field of Search ....................... 111/85, 87, 88, 61; 172/462, 484, 488, 500

[56] References Cited

U.S. PATENT DOCUMENTS

| 345,403 | 7/1886 | Arnett ..................................... 111/85 |
| 511,814 | 1/1894 | Starks et al. ........................... 111/85 |
| 681,037 | 8/1901 | Carney ................................. 111/69 X |
| 3,237,702 | 3/1966 | Orendorff ........................ 172/500 X |
| 3,507,233 | 4/1970 | Greig et al. ............................ 111/85 |
| 3,547,203 | 12/1970 | Jackoboice ........................... 172/500 |
| 4,149,475 | 4/1979 | Bailey et al. ...................... 111/85 X |

FOREIGN PATENT DOCUMENTS

| 452100 | 10/1948 | Canada ................................. 111/85 |
| 822947 | 9/1969 | Canada ................................. 111/85 |
| 820985 | 9/1951 | Fed. Rep. of Germany ........... 172/484 |
| 1936685 | 1/1970 | Fed. Rep. of Germany . |
| 2552810 | 6/1977 | Fed. Rep. of Germany . |
| 2605017 | 8/1977 | Fed. Rep. of Germany . |
| 2640749 | 3/1978 | Fed. Rep. of Germany ............ 111/85 |
| 1026917 | 5/1953 | France ..................................... 111/87 |
| 58456 | 10/1945 | Netherlands ........................... 172/462 |
| 268775 | 8/1970 | U.S.S.R. ................................. 111/85 |

Primary Examiner—Steven A. Bratlie
Attorney, Agent, or Firm—Sprung, Felfe, Horn, Lynch & Kramer

[57] ABSTRACT

Seed drill (FIG. 1) having furrow openers 10 and accompanying press wheels 12 pivotally arranged on frame 1 by mounting means 3. A spring 18 is interposed between the frame and the furrow openers - press wheels. The bias of the spring can be adjusted by operation of the hydraulic cylinder 20, which can also be used to shift the furrow openers - press wheels between working position and the transport position. An adjusting means 14 is interposed between the frame and the furrow openers - press wheels. By operation of the adjusting means the level of a furrow openers relative to the level of the press wheels can be adjusted. The furrow openers - press wheels are arranged in transverse rows and the furrow openers - press wheels of each transverse row are ganged by shafts 22 so that only one of the mounting means in each transverse row need be outfitted with the spring 18 and hydraulic cylinder 20, and the adjusting means 14.

15 Claims, 5 Drawing Figures

SEED DRILL MOUNTING ARRANGEMENT

The invention relates to a seed drill having a frame on which furrow openers consisting of disks set at an angle to the line of travel, and press wheels connected therewith, are disposed for movement in an upright plane on mountings, the furrow openers being at a distance from the press wheels in the direction of travel, and the level of the press wheels being variable in relation to that of the furrow openers.

Such a seed drill is already known through U.S. Pat. No. 3,507,233. Here the furrow openers consist of two disks associated with one another in a V-like arrangement, contacting one another on the forward side of their circumference at a point at which the surface of the soil is cut by them when they are in the working position. Furthermore, the mountings have beams disposed in line with the direction of travel, whose forward end is articulated to the frame of the seed drill, and which are equipped each with a furrow opener and with a press wheel situated behind it. For the variation of the depth of penetration of the furrow openers into the soil, the press wheel mounting means are equipped each with four bores disposed in two upright rows. To make it possible to use the seed drill under severe conditions in the direct planting method, a coulter is furthermore situated ahead of each furrow opener.

In this seed drill it is advantageous that the furrow openers can penetrate quickly into the soil and that no vegetable trash can gather on them. On the other hand, in view of the above-described construction of the mountings and of the arrangement of the furrow openers and press wheels, this seed drill has the disadvantage first that the depths at which the seed is planted in the soil can be adjusted no more than very roughly. This is aggravated by the fact that the variation of the depth of penetration of the furrow openers into the soil must be performed individually in each furrow opener by changing the position of the press wheels, and for this purpose two hexagonal nuts must be removed from each and tightened again after the corresponding bolts have been inserted in different holes.

Furthermore, it is disadvantageous that the furrow openers are capable of following the press wheels when they pass over irregularities in the ground only in the proportion between their distance from the point of attachment of the drag bars to the frame and the distance of the press wheels from these points of attachment, i.e., by only 70%, so that in practical use there is no assurance that the furrow openers will be held at a precise depth. Lastly, the penetration of the furrow openers to the desired depth is dependent on the nature and contour of the terrain and on the speed of operation.

In addition, a seed drill has been disclosed by German Offenlegungsschrift No. 2,552,810, in which the mountings of the furrow openers have bars situated one above the other in two transverse rows and disposed at least approximately parallel to one another, which are joined at one end to the frame and at the other end to the furrow openers by pivots, resilient elements being situated between the frame and the furrow opener mountings and biasing them against the ground. Although in this seed drill the furrow openers, as a result of their being in the form of shovels, and cooperating with the resilient elements, rapidly penetrate into the soil to the desired depth determined by the press wheels, there is the disadvantage here again that the adjustment of the depth of penetration of the furrow openers has to be performed individually and this is a time-consuming chore. Furthermore, due to the fact that the shovels with the press wheels are disposed in three transverse rows, and are offset from one another as seen in the line of travel, this operation is made extremely difficult by poor accessibility, at least in the case of the shovels of the forward and center rows.

It has furthermore been found in practice that the maintenance of the adjusted depth of penetration of such seed drills is possible only in relatively free soils and at low to medium speeds of operation. But if the soils are full of plant roots, there is no way of preventing these roots, especially in the case of couch-grasses, from gathering on the cutting edges and shanks of the shovels. The shovels then increasingly tear up the soil and move irregularly up and down in it, so that there can be no question of a correct planting of the seeds.

But even in operation on free soils, the uniform depth of deposition of the seed can no longer be assured if the seed drill is operated at relatively high speeds. This is to be attributed to the fact that the soil engaged by the side faces of the shovels is thrown up so as to form hills on either side of the furrows, so that, depending on the breadth and position of the press wheels, the shovels ride up or penetrate deeper into the soils. In view of the arrangement of the shovels in transverse rows, this produces the additional disadvantage that earth is thrown by the shovels of the middle and rear rows onto the seed furrows made by the shovels ahead of them and packed down by the press wheels, so that even if the shovels are held at a uniform depth the seeds will be planted at different depths from one seed row to the next. It is for these reasons that it has been recognized that seed drills using shovels are suitable only under very limited conditions, especially in the direct method of planting.

Lastly, a seed drill is disclosed by German Pat. No. 2,605,017 which has the same construction and arrangement of the furrow openers and their mountings as in the seed drill described above, but the level of the press wheels in relation to the furrow openers is variable at least in sets by one adjusting means each. This results in the advantage of a quick and convenient adjustment of the depth of penetration of the furrow openers into the soil as desired in each case. Otherwise, this seed drill also has the disadvantages set forth above, but they are aggravated by the fact that, due to the lack of the resilient elements biasing the furrow openers toward the ground, these disadvantages are intensified under certain conditions.

It is the object of the invention, in a seed drill of the kind of construction described above, to achieve the faultless planting of seeds in the soil at a depth which will be adjustable and will remain constant during operation regardless of the nature of the soil, the vegetation trash present on or in the soil, and the speed of operation.

This object is achieved in accordance with the invention by the combination of the following features which are known in themselves: the mountings have cross members disposed one over the other in two transverse rows and at least approximately parallel to one another, which are attached at one end to the frame and at the other end to the furrow openers by pivots; resilient elements biasing the furrow openers toward the ground are situated between the frame and the mountings, and the height of the press wheels in relation to the furrow openers is variable at least in sets by one adjusting means each.

As a result of these measures, the furrow openers can penetrate under the effect of the resilient elements still more rapidly into the soil to the depth determined by the press wheels than they can in the known seed drill. Furthermore, the furrow openers and the press wheels perform movements of identical magnitude in the vertical plane when they pass over irregularities in the soil, so that regardless of whether the press wheels are situated ahead of or behind the furrow openers, a uniform depth of planting of the seed is assured in every case. Lastly, a convenient adjustment of the penetration of the furrow openers into the soil is achieved regardless whether the group-wise method of adjustment is applied to the individual transverse rows thereof as in the seed drill of German Offenlegungsschrift No. 2,605,017, or whether the furrow openers with their mountings are combined in groups as in the seed drill disclosed by German Pat. No. 2,406,702, of which one is on a middle part affixed to the frame and the other is on side booms pivoted laterally on the frame. The invention is also to include the design in which the furrow openers with their mountings are disposed in groups or all together on frame supports affixed to the frame, and the height of all press wheels in relation to the furrow openers is commonly variable by an adjusting means.

In an embodiment of the invention which is advantageous in its simplicity, the pivots provided at one end of the cross members situated in a transverse row can be moved back and forth by the adjusting means, at least in groups. In this manner, when the adjusting means is operated, a change in the angle of the press wheels and furrow openers with respect to the ground surface is achieved, and thus a change in the height of the press wheels in relation to the furrow openers, without the press wheels themselves having to be adjustable for height on their mountings. If the adjusting means has an operating means cooperating with an indicator means, and planting depth of the seeds in the soil can be adjusted with a maximum of accuracy, the depth indexes can be provided on the indicator means for the differences in level between the furrow openers and the press wheels.

Furthermore, in an embodiment in which the press wheels are situated behind the furrow openers, provision is made for the press wheels to be set at an acute angle to the line of travel. This makes possible the perfect closing of the seed furrows, the press wheels not having to be of any great width. An equal advantage is achieved in the same disposition of the press wheels if the wheels are at an angle to the line of travel, their lower portion being closer than the upper portion of their circumference to the seed furrows produced by the furrow openers. If, in accordance with the invention, with the press wheels also in the same position relative to the furrow openers, each press wheel is mounted for rotation on the bent portion of a shaft releasably fastened to the mountings, all of the press wheels can be adjusted for camber and/or positive or negative caster according to the conditions in which they are to be used.

In accordance with the invention, furthermore, the resilient elements are to be joined to a lever mechanism whose position is variable in relation to the frame. This results in the advantage that the tension of the resilient elements and hence of the pressure exercised on the furrow openers and press wheels can be varied in common according to requirements. If the resilient elements in this case are disposed at a vertical distance above and at least approximately parallel to the cross members attached to them, when the furrow openers are in the working position, the preset force will always be exercised by the resilient elements on the furrow openers independently of any oscillating upward and downward movement of the press wheels and furrow openers, which is unavoidable on uneven ground.

In an advantageous embodiment of the invention, provision is made such that the resilient elements are in the form of compression springs, each disposed on a rod attached at one end to the lever mechanism and at the other to the cross members of the mountings, which are located in a transverse row. Furthermore, the rods are to be disposed for longitudinal displacement each in a bearing, and are to be equipped with a stop on the side of the bearing facing away from the resilient elements, the lever mechanism being connected to a lifting means. By these measures it is brought about that, the lifting means can serve not only for biasing the resilient elements in common, but also for raising all of the furrow openers and press wheels to the transport position or lowering them again to the working position. If the lifting means has at least one hydraulic or pneumatic cylinder, the adjustments of the resilient elements and the upward and downward movements of the furrow openers and press wheels can be produced from a remote operating station, such as the driver's seat of the tractor drawing the seed drill. It is especially advantageous in this case for the lifting means to be associated with an indicator means. In this manner a precise indication can be given of the force with which the furrow openers and press wheels must be loaded according to the existing soil conditions.

In a preferred embodiment of the invention, each furrow opener consists, in a manner known from German Pat. No. 296,048, of only one disk. This design is characterized first by the fact that these furrow openers penetrate even into extremely heavy soils more easily than those consisting of two disks each, i.e., the so-called dual disk furrow openers. Furthermore, the disks of these single-disk furrow openers can be made of thicker material and thus are more wear resistant than dual-disk furrow openers of the same quality of material. The reason for this is that the disks of dual-disk furrow openers must be made of relatively thin, resilient material, because if small stones and other foreign bodies are to be prevented from being caught between them, it is necessary that they contact one another over a relatively great portion of their forward circumference. Even so, in view of the different depths at which the individual types of seed need to be planted, it is not always possible, especially in clayey soils, to prevent small stones from getting caught between the furrow opener disks and causing trouble and interruptions of operation. These difficulties of accessibility and susceptibility to trouble are obviated in single-disk furrow openers. Moreover, the construction cost itself is substantially lower per seeding row for single-disk furrow openers than it is for dual-disk furrow openers.

If the attitude angle of the opener disks with respect to the line of travel is variable, the operation of the furrow openers can be adapted to the different kinds of soil in an additionally advantageous manner. For example, in the case of light, sandy or friable soils, the attitude angle of the opener disks can be made larger, for the purpose of achieving perfectly open furrows for the planting of the seed in the soil. In heavy and tight soils, however, a smaller attitude angle of the opener disks is advantageous. It is also possible in this manner, when the seed drill is used in the direct seeding method, to keep the traction force which this machine requires within tolerable limits.

An additional advantage is achieved by the fact that the acute attitude angle of the press wheels with respect to the line of travel is the opposite of the attitude angle of the furrow opener disks. And yet the lateral forces produced as a result of the attitude of the opener disks is compensated within each individual mounting.

The invention furthermore provides that the furrow openers together with their corresponding press wheels are, in a manner known in itself, arranged in two transverse, parallel rows and offset from one another as seen in the direction of travel. These measures permit trouble-free planting even with close distances between planting rows, because then the lateral clearance not only between the furrow openers but also between the press wheels is so great that clogging with vegetation is largely eliminated when the direct seeding method is used.

In another embodiment of the invention,, at least two furrow openers are disposed on one mounting in a manner disclosed by Great Britain Pat. No. 1,218,785. The advantage of this construction consists substantially in the fact that only half the number of mountings are used which otherwise would be required for the mounting of the furrow openers and press wheels. If in this case the two furrow openers disposed on each mounting are at an average distance apart amounting to twice the row spacing of the seeds being planted in the soil, then even where the spacing between the seed rows is very close, it is possible to have a sufficiently great clearance between the individual furrow openers and press wheels.

In this connection, each pair of combined furrow openers, together with the pair of press wheels provided for them, is to be mounted, in accordance with the invention, so as to be rotatable on its mounting about an axis situated centrally between them and parallel to the direction of travel. In this manner a precise depth maintenance of the individual furrow openers is achieved to the same degree as when the individual furrow openers and press wheels are mounted on individual mountings, even in the case of coarse, lumpy soils or uneven ground surface.

If the mountings are disposed on the frame, and the furrow openers as well as the press wheels are disposed on the mountings so as to be adjustable transversely of the line of travel, the embodiment of the seed drill with the substantially simplified arrangement of the furrow openers can be adjusted to any of the planting row spacings commonly used for the planting of the individual types of seeds.

Figure 2:
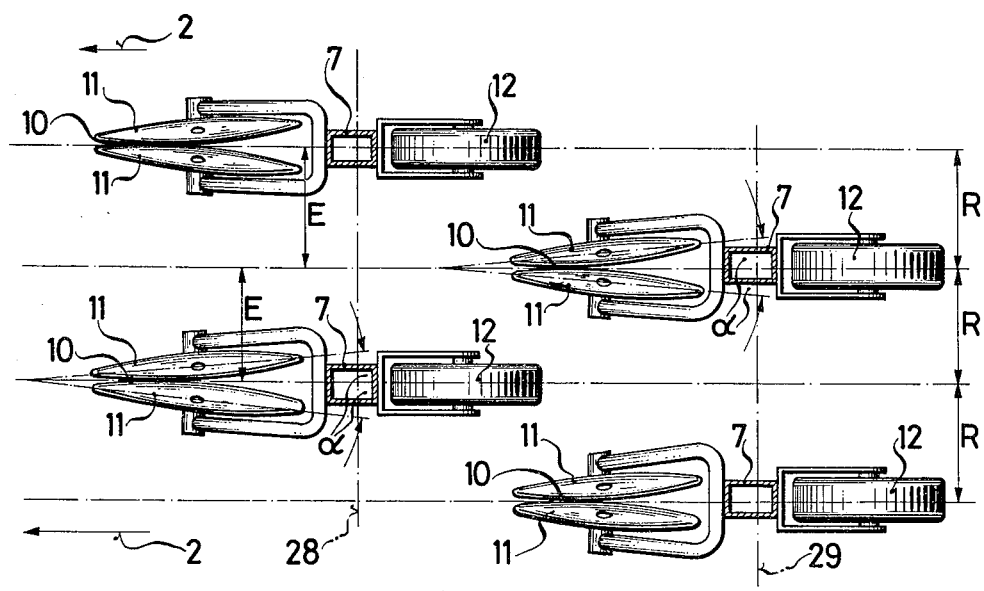
Figure 3:
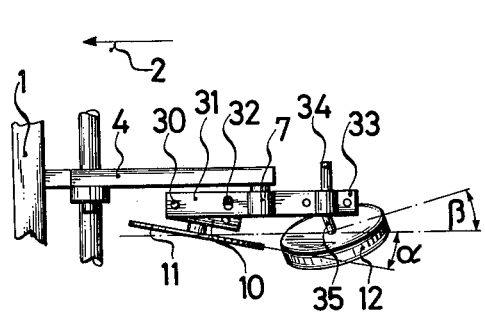
Figure 4:
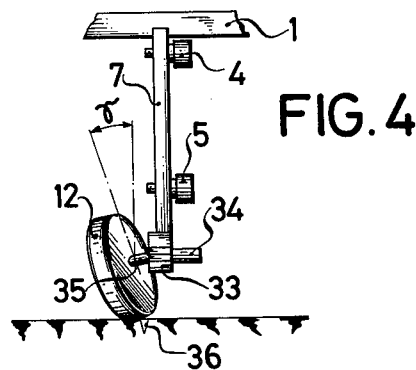
Figure 5:
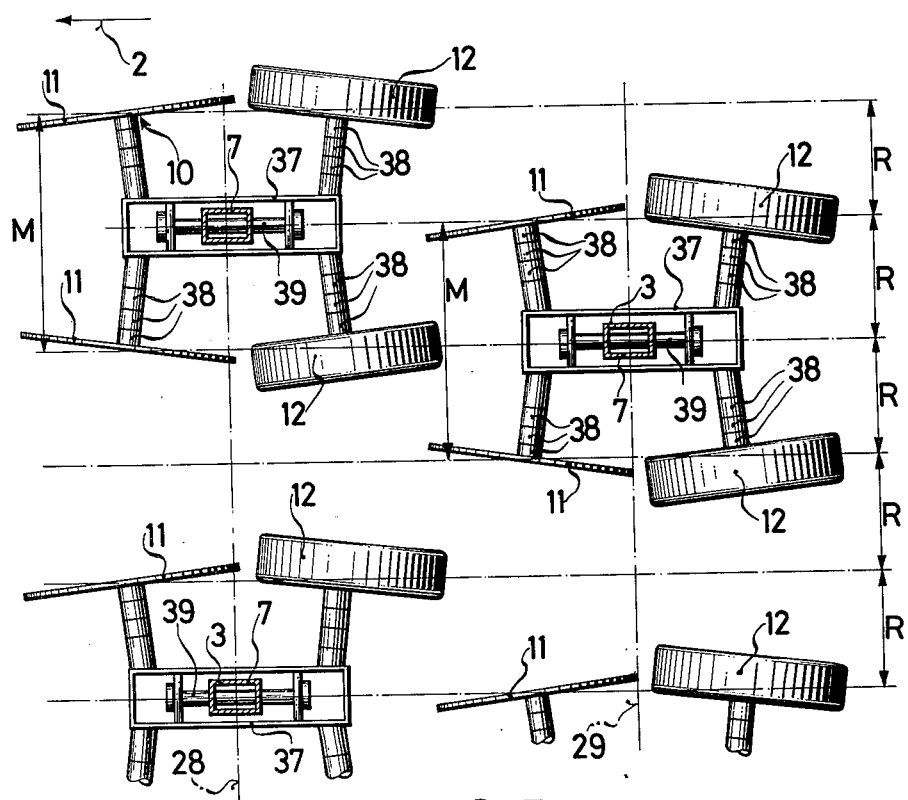

The invention will now be further explained with the aid of the appended drawings, wherein:

FIG. 1 is a fragmentary side view of a seed drill having furrow openers and press wheels mounted in accordance with the invention, FIG. 2 is a plan view of the arrangement of a number of furrow openers and press wheels of the same seed drill, FIG. 3 is also a plan view of the arrangement of a seed drill consisting of one furrow opening disk and having the associated press wheel, FIG. 4 is a rear elevation of the disposition of a press wheel, and FIG. 5 is a plan view of the arrangement of a plurality of furrow openers and press wheels, which are disposed in pairs, one pair on each mounting.

The seed drill has a frame 1 on which a plurality of mountings, generally designated at 3, of parallelogram-like construction, are disposed at intervals transversely of the direction of travel indicated by the arrow 2 in such manner as to be able to be rocked in a vertical plane. Each of these mountings 3 consists of an upper cross member 4, a lower cross member 5 disposed parallel thereto, and an upright member 7 attached to the cross members by means of the pivot joints 6. The forward ends of the cross members 4 and 5 are joined to the frame 1 by the pivot joints 8.

At the bottom end of the upright 7 is the bracket 9 on whose forward end the furrow opener 10 is disposed, which consists of the two rotatably mounted disks 11. As seen in FIG. 2, the two disks 11 of each furrow opener 10 assume such an attitude toward one another that they form a V, each disk 10 forming an acute angle $\alpha$ with the line of travel 2. At the rear end of the bracket 9 the press wheel 12 is rotatably mounted.

In each mounting 3, the forward pivot 8 of the upper cross member 4 is on a lever 13 articulated to the frame 1 with its free end attached to the adjuster 14 whose operating means is the threaded spindle 15. The forward pivot of the lower cross member 5 of each mounting 3, however, is provided directly on the frame 1. Also, a rod 16 disposed parallel to the lower cross member 5 at a vertical distance A therefrom is provided thereon, which is articulated to the lever mechanism 17 and on which there is installed the resilient member 18 in the form of a compression spring. This lever mechanism 17 is fulcrumed on the one hand on the frame 1 and on the other hand it is connected to the lifting means 19 having the hydraulic cylinder 20 disposed also pivotingly on the frame 1. Moreover, the levers 13 of the individual mountings 3 and the bell cranks 21 of the lever mechanisms 17 are all ganged together by means of the transverse bars 22. Lastly, the stops 24 are provided on the rods 16 behind the bearings 23 which provide for the displaceable mounting of the rods 16 on the lower cross members 5.

To adjust the depth of penetration of the seed drills 18 into the soil, the threaded spindle 15 is operated. The rocking of the levers 13 which this produces moves the upper cross members 4 of all mountings 3 in or away from the direction of movement 2, and this tilts the uprights 7 to a forwardly or rearwardly inclined position. When the uprights 7 are tilted forward, the furrow openers 10 tilt downward and rearward at an angle about the pivots 6, but the press wheels 12 are moved upward and forward, thus allowing the furrow openers to penetrate more deeply into the soil. If the uprights 7 are tilted rearwardly, however, the furrow openers can penetrate less deeply into the soil. For the purpose of the precise determination of this depth of penetration, the indicator means 25 is provided on the adjusting means 14.

If the bias of the resilient means 18 is to be changed to adapt to soil conditions, it is necessary only to actuate the hydraulic pump to which the hydraulic cylinder 20 is connected. For the purpose of achieving a precisely repeatable adjustment of the bias, the lifting means 19 is equipped with the indicator means 26.

The lifting of the furrow openers 10 with the press wheels 12 to the transport position is accomplished in the same manner. In this case the hydraulic cylinder 20 rotates the bell cranks 21 of the lever mechanism 17 clockwise, as seen in the drawing, about their fulcrums 27, so that when the stops 24 engage the brackets 23, the rear end of the lower cross members, the uprights 7 and the furrow openers 10 and press wheels 12 mounted thereon will move upwardly.

As seen in FIG. 2, the furrow openers 10 with the press wheels 12 are in a staggered arrangement in the two parallel transverse rows 28 and 29, as seen in the direction of travel 2, the average lateral spacing E of the adjacent furrow openers 10 corresponding precisely to the row spacing at which the seeds are to be planted in the soil. In order to adapt this spacing E to the seed row spacing R, which differs according to the individual kinds of seed, the levers 13 and the bell cranks 21, with the exception of those to which the adjusting means 14 and those to which the lifting means 19 are directly connected, are mounted for lateral adjustment on the transverse gang bars 22, in a known manner which is not indicated in the drawings.

In the case of the embodiment represented in FIGS. 3 and 4, each furrow opener consists of only one disk 11. Also, each furrow opener 10 is disposed on the bracket 31 fastened to the upright 7, in such a manner that it can be pivoted laterally on the pin 30, the bracket having the elongated hole 32 to provide for the variation of the attitude angle α of the furrow opener 11. On its rearward end the clamp 33 is provided on the bracket 31 for the releasable mounting of the shaft 34 on whose bent portion 35 the press wheel is mounted. The press wheel 12 is set at the acute angle β to the line of travel 2, this angle being the opposite the angle α of the furrow opener disk 11. Furthermore, the press wheel is cambered at an angle of inclination γ transversely of the line of travel 2, the lower portion of the circumference of the press wheel being closer than the upper portion of its circumference to the seed furrow 36 produced by the furrow opener 10. To vary the attitude angle β and the angle of inclination γ, it is necessary only to turn the shaft 34 in the clamp 33.

In the embodiment represented in FIG. 5, the furrow openers 10 with the press wheels 12 are, as in the embodiment shown in FIG. 2, offset from one another in the two transverse parallel rows 28 and 29 as seen in the direction of travel 2. In this case, however, two furrow openers 10 and two press wheels 12 are provided on each mounting 3, and the distance M between the two furrow openers 10 disposed on the same mounting 3 is twice as great as the seed row spacing R of the seed being planted in the soil. Now, in order to be able to adapt this spacing M to the different seed row spacings R for the individual kinds of seeds, a plurality of spacing sleeves 38 are provided between the brackets 37 and the furrow openers 11 in the one case and the press wheels 12 in the other. The spacing M is varied by changing individual spacing sleeves 38 from the inside to the outside of the furrow openers 11 and press wheels 12, and vice versa.

For the adaptation of the press wheels 12 and with them the furrow openers 11 to the soil surface, the brackets 37 are lastly mounted on the uprights 7 so as to be rotatable about the shaft 39 disposed in the line of travel and in the center between the furrow opener disks 11 disposed thereon.

I claim:

1. A seed drill comprising a frame and furrow openers each having a press wheel joined thereto, the furrow openers and the adjoined press wheels being disposed in two transverse rows, one row behind the other row, and the furrow openers and the adjoined press wheels of one row being offset from the furrow openers and adjoined press wheels of the other row, as seen in the direction of travel, the furrow openers comprising at least one disk set at an angle to the direction of travel, each furrow opener and its press wheel being mounted on the frame for movement in an upright plane by a mounting means comprising two cross members situated one over the other and extending at least approximately parallel to one another, and which are each joined by pivots at one end to the frame and at the other end to the furrow opener and its press wheel, a resilient element interposed between the frame and one of the mounting means biasing the furrow openers toward the ground, the resilient element being disposed at least approximately parallel to the cross members when the furrow openers are in the working position, and adjusting means for adjusting the level of one of the furrow openers in relation to its press wheel by movement of some of the pivot joints between the cross members and the furrow openers, and ganging means interconnecting said one of the furrow openers and at least another of the furrow openers so that the adjusting of said one furrow opener is effective to to adjust a gang of the furrow openers.

2. Seed drill of claim 1, the adjusting means comprising an operating means and an indicating means.

3. Seed drill of claim 1, in which the press wheels are situated behind the furrow openers, and the press wheels have an acute attitude angle beta with respect to the line of travel.

4. Seed drill of claim 1, in which the press wheels are situated behind the furrow openers, and the press wheels are inclined transversely of the line of travel, the lower portion of the circumference of the press wheels being closer to the seed furrows produced by the furrow openers than the upper portion portion of the circumference.

5. Seed drill of claim 1, in which the press wheels are situated behind the furrow openers, each press wheel being rotatably mounted on a bent portion of a shaft which is joined to the mounting means.

6. Seed drill of claim 1, and a lever mechanism operatively interposed between the resilient element and the frame, and means for varying the position of the lever mechanism with respect to the frame.

7. Seed drill of claim 6, the resilient element comprising a compression spring, and a rod on which the spring is disposed and which is mounted at one end thereof on the lever mechanism and at the other end thereof on the lower cross member.

8. Seed drill of claim 7, and a bearing in which said rod is displaceably disposed, the rod being equiped each with a stop on the side of the bearing facing away from the resilient element, and the lever mechanism being connected to a lifting means.

9. Seed drill of claim 8, the lifting means comprising at least one cylinder which can be actuated by a fluid, a comprising an indicating means.

10. Seed drill of claim 1, each furrow opener comprising only one disk, the attitude angle alpha of the furrow opener disks with respect to the direction of travel being variable.

11. Seed drill of claim 10, the acute angle beta of the press wheels with respect to the line of travel being the opposite of the attitude angle alpha of the furrow opener disk.

12. Seed drill of claim 1, at least two furrow openers each joined to a press wheel being disposed on each mounting means, and the two furrow openers disposed on each mounting means being at an average distance (M) apart which is twice as great as the row spacing (R).

13. Seed drill of claim 12, the two furrow openers and adjoined press wheels mounted on each mounting means being rotatably mounted on their mounting means, about an axis disposed in the center between them and in line with the direction of travel.

14. Seed drill of claim 13, the mounting means being adjustably disposed on the frame, and the furrow openers and the adjoined press wheels being disposed on the mounting means for adjustment transversely of the line of travel.

15. Seed drill of claim 12, the mounting means being adjustably disposed on the frame, and the furrow openers and the adjoined press wheels being disposed on the mounting means for adjustment transversely of the line of travel.

* * * * *